United States Patent [19]
Caliri

[11] 3,834,248
[45] Sept. 10, 1974

[54] TORQUE COUPLE WITH STRUCTURE BORNE NOISE ISOLATION

[75] Inventor: Charles Thomas Caliri, Cincinnati, Ohio

[73] Assignee: Cincinnati Milacron Inc., Cincinnati, Ohio

[22] Filed: July 5, 1973

[21] Appl. No.: 376,409

[52] U.S. Cl. .................................. 74/443, 74/467
[51] Int. Cl. ....................... F16h 55/14, F16h 57/04
[58] Field of Search ............................. 74/443, 467

[56] References Cited
UNITED STATES PATENTS
3,065,822  11/1962  McAfee et al. .................. 74/467 UX
3,213,703  10/1965  Fitzgerald ........................ 74/467 X
3,454,136  7/1969   Stark................................ 74/467 X
3,539,035  11/1970  Wolkenstein ..................... 74/467 X
3,651,706  3/1972   Galbarini ......................... 74/467 X Primary Examiner—Leonard H. Gerin

[57] ABSTRACT

An apparatus for the transmission of torque between two members of a machine which reduces the structure borne vibration and noise through the use of pressurized fluid at the interface of torque transmitting teeth.

5 Claims, 2 Drawing Figures

PRESSURE REDUCING VALVE

3,834,248

TORQUE COUPLE WITH STRUCTURE BORNE NOISE ISOLATION

BACKGROUND OF THE INVENTION

This invention relates to torque transmission between machine members. Machine elements such as gears, sprockets and sheaves which must be rotatably mounted and must transmit power usually are found to generate noise in their operation. For example, gears are designed to have rolling contact upon their teeth, but it is well-known in gear art that smooth surfaces on gear tooth flanks are difficult to obtain. As a result, inaccuracies in the manufacture of gear teeth lead to a phenomenon known as "hammering" of gear teeth; i.e., the dynamic interaction of gear teeth while in operation produces audible noise from the vibration of one tooth striking on another. This vibration of "noise" is generally manifested in two fashions (1) air borne noise or (2) structure borne noise.

Air borne noise may be defined as a radiated vibration generated by machine members while structure borne noise is defined as vibrations which travel from their point of origin through the immediate machine member and on through remote machine members to some final point where the vibration is then radiated as audible noise.

This invention is directed to the reduction and isolation of structure borne noise. Prior art devices were developed which involved separating the locating portion of a rotational machine member and insulating it from the rest of the device. In a common case for example, the locating hub of a gear was manufactured as a separate piece from the gear body, which was then molded in position with the main gear body by means of an elastomeric bonding material. However, with this prior art method of noise reduction it was extremely difficult to keep the locating hub concentric to the main body of a gear while introducing the elastomeric material. As a result, unique tooling had to be originated to hold the two machine members; i.e., the hub and the main body, in the correct relation to one another during the molding process. Further, the elastomeric bonding material would have to transmit torque at its interface with machine elements and, therefore, it would be in shear and would have to be of sufficient design area to transmit required torque.

With the present invention, however, no unique tooling is required to implement structure borne noise damping, and the torque transmitting capabilities between a supporting shaft and the hub of the machine member is not dependent upon the damping material. Further, the prior art elastomeric damping devices comprise a system with a fixed frequency of response, whereas the instant invention allows for the tuning of the system frequency through control of parameters of the fluid damping material.

SUMMARY OF THE INVENTION

This invention comprises an apparatus for the isolation and reduction of structure borne noise in machine members. Specifically, where a rotatably mounted machine member, such as a gear, is used and that member has a hub which is supported by a shaft and receives torque from the shaft through keys, such as spline teeth, pressurized oil is introduced through the shaft to a central distributing point within the hub, and is allowed to exit through the clearances between the torque transmitting keys, or splines, and the complimentary keyways, or spline tooth spaces, within the hub.

By this introduction of pressurized oil into the torque transmitting teeth, there is maintained a film of oil which absorbs and cushions the vibrations during torque transmission. This is a phenomenon known as "squeeze film damping" in the art of mechanical vibrations.

Thus, while maintaining the desired characteristics of having mechanically cooperating teeth for torque transmission, a thin cushioned film is used as an interface to change the impedance of structure borne noise, and thus isolate and reduce it. Further, the damping characteristics of the system may be changed by varying the pressure of the oil and by varying the viscosity of the oil, for example.

The invention herein described, also negates the need for special tooling, since ordinary key members are utilized, and, in fact, a more useful key device is promoted, since any slight inaccuracies in fit inure to the benefit of the machine members' damping power; i.e., the oil will exit along paths provided by clearances between the keys and keyways, and any slight openings of the clearance tolerance will not result in shake or hammer as in conventional key drives, but rather will be filled by an additional increment of damping fluid.

It is the object, therefore, of the present invention to provide damping and isolation of structure borne noise in machine members.

It is also an object of the present invention to negate the need for special tooling to implement structure borne noise isolation.

A further object of the present invention is to provide a tunable structure borne vibration damping system.

Other object and advantages of the present invention should be readily apparent by reference to the following specification, considered in conjunction with the accompanying drawings forming a part thereof, and it is to be understood that any modifications may be made in the exact structural details there shown and described within the scope of the appended claims without departing from or exceeding the spirit of the invention.

DESCRIPTION OF THE PREFERRED EMBODIMENT

Figure 1:
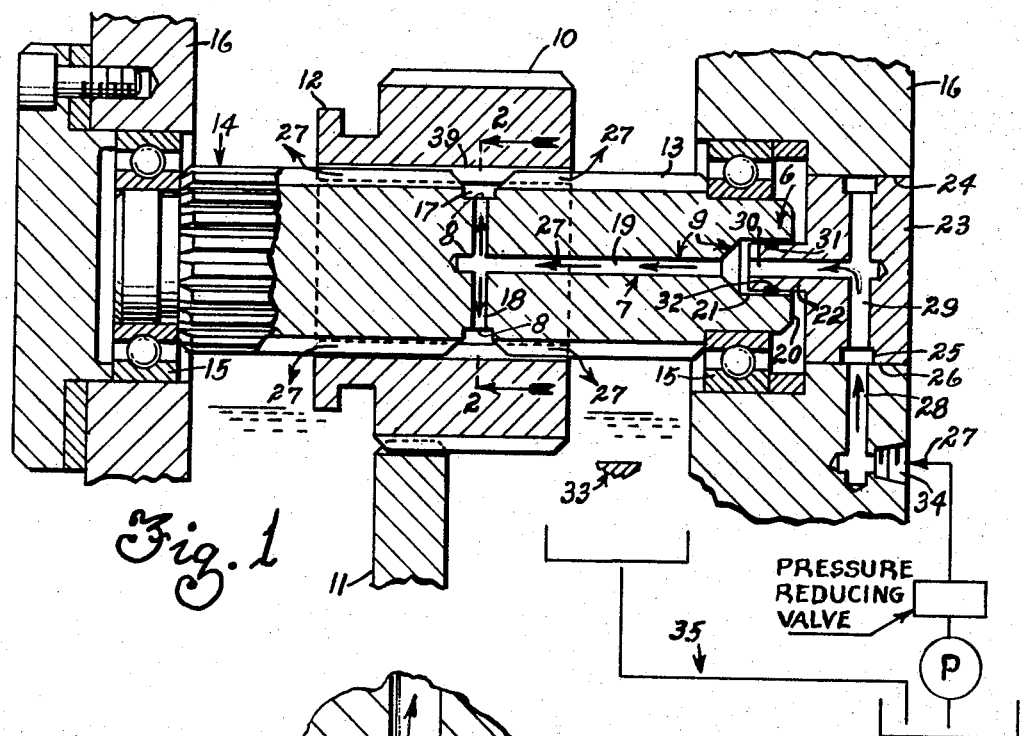
FIG. 1 is a sectional view along the axis of a rotatably mounted gear, showing torque-transmitting teeth, interdrilling within the shaft for the introduction of vibration damping fluid, and a rotary coupling at the end of said shaft for the introduction of fluid.

Referring now to the drawings and particularly to FIG. 1 thereof, there is shown a gear 10 which may either receive torque from, or impact torque to, a pinion 11. The gear 10 has a hub 12 which is slidably mounted upon the splines 13 of the shaft 14. The shaft 14 is rotatably mounted in bearings 15 at its ends, where the bearings 15 are located in stationary housing walls 16 to support the entire gear assembly. The shaft 14 has splines 13 along its full length to permit shifting of the gear 10 for the intermesh with the pinion 11. Any suitable radially projecting lugs, such as square keys, may be substituted for the spline teeth 37 and cooperating receptacles such as square keyways may be substituted for the spline tooth spaces 38 without affecting the instant invention.

The shaft 14 has a diametral groove 17 turned around the outer periphery of it to permit the equalization of pressure which may be introduced into that zone through a fluid conduit system 9. A cross-drilled hole 18 provides radial ports 8 through the shaft 14 at the diameter of the groove 17 and a central hole 19 provides an axial port 7 from one end 20 of the shaft 14 to intersect the cross-drilled hole 18.

At the end 20 of the shaft 14 where the axial hole 19 originates, there is also provided an accurate bore 21 into which extends the pilot end 22 of the distributor plug 23 which plug 23 has been fixed in a bore 24 in one of the stationary housing walls 16. The distributor plug 23 is cylindrical in shape with a diametral groove 25 turned around its outermost diameter 26 to permit easy entrance of fluid 27 from a distributor hole 28 in the wall 16. A cross-drilled hole 29 is provided through the diametral groove 25 in the distributor plug 23 and a central hole 30 is provided through the pilot end 22 of the distributor plug 23 which intersects the cross-drilled hole 29.

A seal 31 is located in a seal groove 32 around the pilot end 22 of the distributor plug 23. This seal 31 extends into and bears against the acccurate bore 21 in the end 20 of the shaft 14. Thus, while the shaft 14 is rotating, the accurate bore 21 is rubbing on the seal 31 and thereby provides a rotary fluid coupling means 6 through which fluid 27 may be introduced from the stationary distributor plug 23 into the rotating shaft 14 without leakage to the environment 33.

The wall 16 provided with a threaded hole 34 which intersects the distributor hole 28 to feed fluid 27 to the distributor plug 23. The threaded hole 34 is connected to a fluid supply source 35 at which source regulated, pressurized fluid 27 is sent to the shaft 14.

Figure 2:
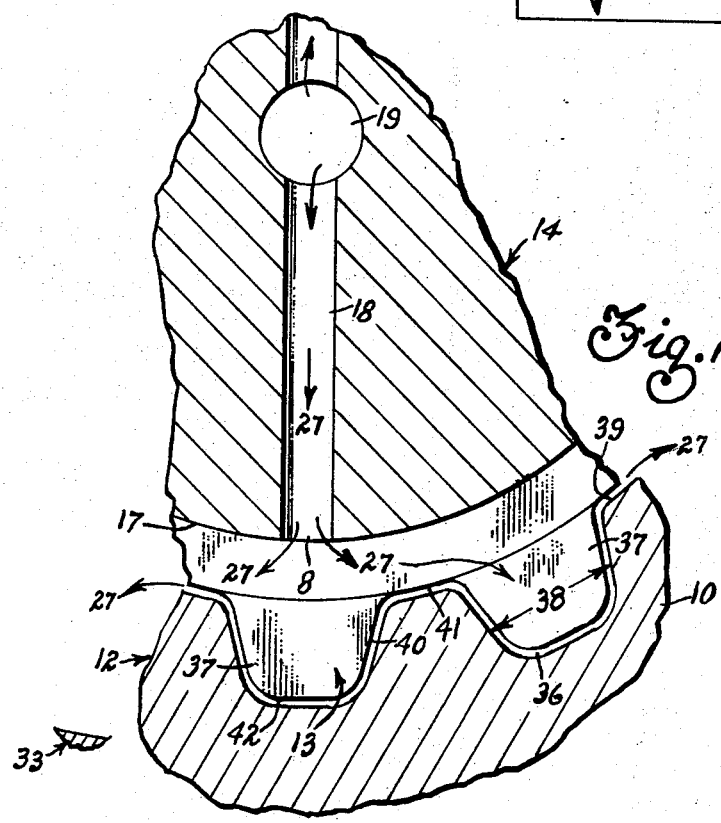
FIG. 2 is an enlarged sectional view of FIG. 1 taken along the line 2—2, showing involute spline teeth and clearances.

Referring now to FIG. 2, the section shows the axial hole 19 through the shaft 14 and the cross-drilled hole 18 which feeds fluid 27 into the diametral groove 17 on the shaft 14. Here it may be seen that the splines 13 which form the mechanical torque couple have a finite clearance 36 around the spline teeth 37 formed by the spline tooth spaces 38 within the bore 39 of the gear hub 12.

When fluid 27 is introduced into the wall 16, as shown in FIG. 1, and the fluid 27 makes its path through the axial hole 19 in the shaft 14 and into the cross-drilled hole 18, as shown in FIG. 2, the fluid 27 then flows through the clearance 36 on the flanks 40, roots 41, and crests 42 of these spline teeth 37 thereafter to exit to the environment, after which time the fluid 27 is collected and recirculated to the fluid supply source 35.

When the gear 10 is in mesh with the pinion 11, the fluid 27 within the clearance 36 about the spline teeth 37 acts as a cushion which may be varied in stiffness through modification of the parameters of pressure and viscosity. Thus structure borne noise is reduced by virtue of an impedance change phenomenon known in mechanical vibrations art as "squeeze film damping."

What is claimed is:

1. An improved torque coupling comprising:
   a. a shaft having a plurality of external spline teeth;
   b. a hub received on the shaft and having a bore containing internal spline tooth spaces;
   c. a fluid conduit system in one of said shaft and hub having ports to introduce fluid into the internal spline tooth spaces; and
   d. means to introduce fluid into the said fluid conduit system.

2. The torque coupling of claim 1, wherein said fluid conduit system is comprised of radial ports in said shaft, and a central axial port in said shaft.

3. The torque coupling of claim 2, wherein said shaft is rotatably mounted, and further wherein said means to introduce fluid into said fluid conduit system comprises a suitable rotary fluid coupling.

4. An improved machine tool torque coupling comprising:
   a. a rotatably mounted shaft with a plurality of radially extending external teeth;
   b. a hub received on the shaft and having a bore containing a plurality of radially extending internal tooth spaces conforming to said external teeth;
   c. a fluid conduit system in one of said shaft and hub to introduce fluid into said internal tooth spaces;
   d. a fluid source; and
   e. a rotary fluid coupling connecting between said source and conduit system, to introduce fluid into said fluid conduit system.

5. The torque coupling of claim 4, further comprising finite clearances between the inclusive surfaces of the said external teeth and the inclusive surfaces of the said internal tooth spaces, said finite clearances defining additional fluid passageways through which fluid from the fluid conduit system moves to provide a squeeze film damping medium.

* * * * *